Oct. 7, 1924.  
J. S. KRUSE  
1,510,626  
APPARATUS FOR USE IN GAMES  
Filed June 20, 1923
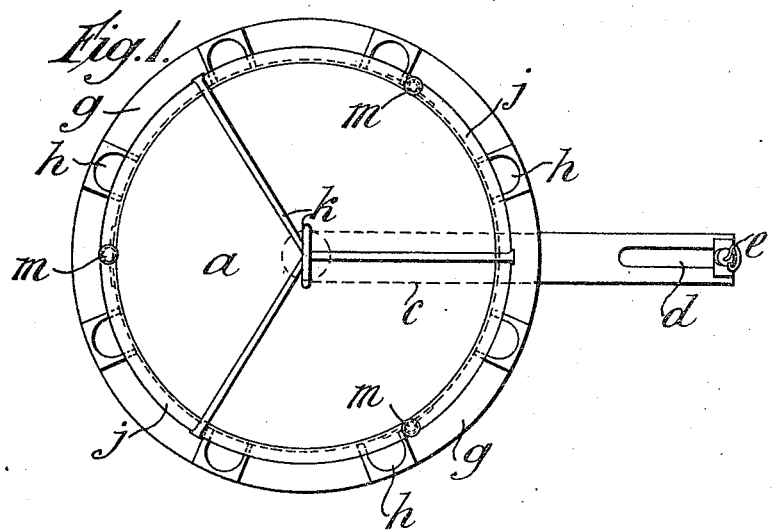
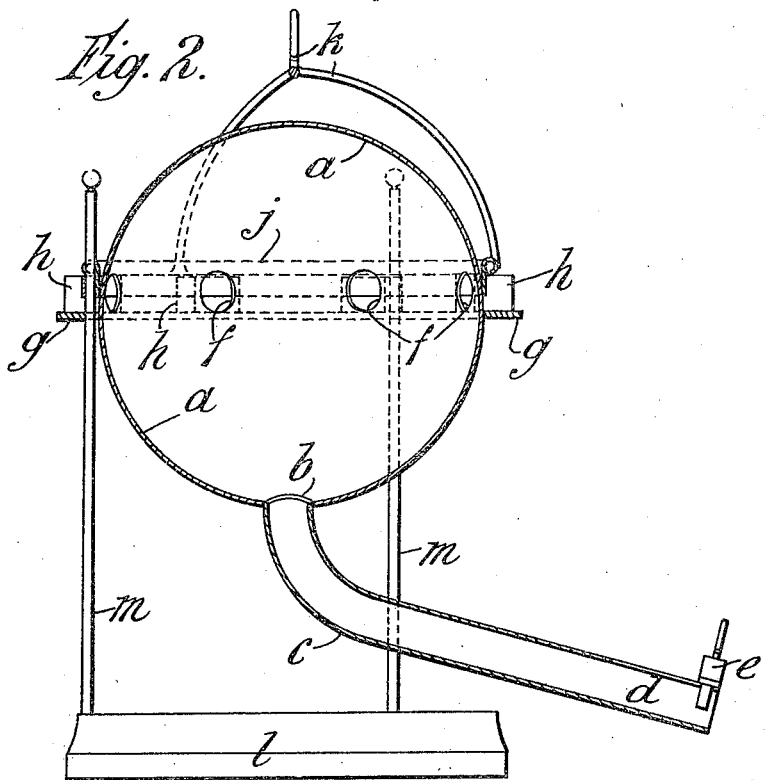
INVENTOR  
JOHANN SECUNDUS KRUSE,  
By his Attorneys, Patented Oct. 7, 1924.

1,510,626

UNITED STATES PATENT OFFICE.

JOHANN SECUNDUS KRUSE, OF LONDON, ENGLAND.

APPARATUS FOR USE IN GAMES.

Application filed June 20, 1923. Serial No. 646,546.

*To all whom it may concern:*

Be it known that I, JOHANN SECUNDUS KRUSE, a subject of the King of Great Britain, residing at 10 Royal Avenue, Chelsea, London, England, have invented new and useful Improvements in Apparatus for Use in Games, of which the following is a specification.

This invention relates to apparatus for use in games, in which a number of balls is simultaneously freed, the game consisting in observing which ball reaches the final goal first.

According to this invention the apparatus consists of a vessel of preferably regular curvature, extending from which is a tube leading to a trough. Above the level of the bottom of the vessel is arranged a number of receptacles having inclined bottoms so that balls placed in them run down into the curved vessel. The balls are prevented from running into the vessel by a ring which is provided with a handle and extends round the mouths of the receptacles and causes the balls to be retained therein.

When the ring is lifted, the balls are freed and run into the vessel and down the tube to the trough, the relative diameters of the balls and the tube being nearly the same so that the balls have to pass through the tube in sequence.

The accompanying drawings show apparatus made in accordance with this invention. Figure 1 is a plan and Figure 2 is a vertical section.

*a* is a spherical vessel extending from an outlet *b* in which is a tube *c* leading to a trough *d* provided with a shutter *e* at its end. In the vessel *a* is a number of holes *f*, and *g* is a ring extending round the vessel adjacent to the holes *f* and having a number of receptacles *h* whose mouths register with the holes *f*. *j* is a ring which is inserted between the mouths of the receptacles *h* and the holes *f*, which ring is provided with a handle *k* by which the ring can be lifted. The vessel is mounted on a stand *l* by legs *m* which also serve as guides for the ring *j*.

When using the apparatus a number of balls is placed in the receptacles and the ring *j* is lifted, thus allowing the balls to pass through the holes *f* into the vessel *a* from which they issue through the outlet *b* and proceed down the tube *c* into the trough *d*, where the balls are withdrawn from the trough *d* by lifting the shutter *e*.

The balls are usually of the same size and weight and the distance of travel of all the balls is the same but if desired the balls may be of varying weights and be given varying lengths of travel.

What I claim is:—

1. Apparatus for use in games, consisting of a vessel, receptacles arranged around the vessel and having mouths leading to the vessel, a removable ring closing the mouths of the receptacles and an exit from the vessel.

2. Apparatus for use in games, consisting of a vessel, receptacles arranged around the vessel and having mouths leading to the vessel, a removable ring closing the mouths of the receptacles and a tube extending from the vessel.

3. Apparatus for use in games, consisting of a vessel of regular curvature, receptacles arranged round the vessel and having mouths leading to the vessel, a removable ring closing the mouths of the receptacles and an exit from the vessel.

4. Apparatus for use in games, consisting of a vessel of regular curvature, receptacles arranged around the vessel and having mouths leading to the vessel, a removable ring closing the mouths of the receptacles and a tube extending from the vessel.

5. Apparatus for use in games, consisting of a vessel, receptacles arranged around the vessel and having mouths leading to the vessel, a removable ring closing the mouths of the receptacles, an exit from the vessel and legs supporting the vessel and engaging the ring to guide the same.

6. Apparatus for use in games, consisting of a vessel of regular curvature, receptacles arranged around the vessel and having mouths leading to the vessel, a removable ring closing the mouths of the receptacles, an exit from the vessel and legs supporting the vessel and engaging the ring to guide the same.

7. Apparatus for use in games, consisting of a vessel, holes in the vessel, receptacles around the vessel and having mouths leading to the holes, a removable ring closing the mouths of the receptacles and an exit from the vessel.

8. Apparatus for use in games, consisting of a vessel, holes in the vessel, receptacles around the vessel and having mouths leading to the holes, a removable ring closing the mouths of the receptacles and a tube extending from the vessel.

9. Apparatus for use in games, consisting of a vessel of regular curvature, holes in the vessel, receptacles around the vessel and having mouths leading to the holes, a removable ring closing the mouths of the receptacles and an exit from the vessel.

10. Apparatus for use in games, consisting of a vessel of regular curvature, holes in the vessel, receptacles around the vessel and having mouths leading to the holes, a removable ring closing the mouths of the receptacles and a tube extending from the vessel.

11. Apparatus for use in games, consisting of a vessel, holes in the vessel, receptacles around the vessel and having mouths leading to the holes, a removable ring closing the mouths of the receptacles, an exit from the vessel and legs supporting the vessel and engaging the ring to guide the same.

12. Apparatus for use in games, consisting of a vessel of regular curvature, holes in the vessel, receptacles around the vessel and having mouths leading to the holes, a removable ring closing the mouths of the receptacles, an exit from the vessel and legs supporting the vessel and engaging the ring to guide the same.

In testimony that I claim the foregoing as my invention I have signed my name this 8th day of June, 1923.

JOHANN SECUNDUS KRUSE.